United States Patent
Luong et al.

(12) 
(10) Patent No.: US 11,488,067 B2
(45) Date of Patent: Nov. 1, 2022

(54) TRAINING MACHINE LEARNING MODELS USING TEACHER ANNEALING

(71) Applicant: Google LLC, Mountain View, CA (US)

(72) Inventors: Thang Minh Luong, Mountain View, CA (US); Quoc V. Le, Sunnyvale, CA (US); Kevin Stefan Clark, Redwood City, CA (US)

(73) Assignee: Google LLC, Mountain View, CA (US)

( * ) Notice: Subject to any disclaimer, the term of this patent is extended or adjusted under 35 U.S.C. 154(b) by 348 days.

(21) Appl. No.: 16/872,271

(22) Filed: May 11, 2020

(65) Prior Publication Data

US 2020/0364617 A1 Nov. 19, 2020

Related U.S. Application Data

(60) Provisional application No. 62/847,220, filed on May 13, 2019.

(51) Int. Cl.
- *G06N 20/00* (2019.01)
- *G06N 3/04* (2006.01)
- *G06N 3/08* (2006.01)
- *G06N 7/00* (2006.01)

(52) U.S. Cl.
CPC .................................. *G06N 20/00* (2019.01)

(58) Field of Classification Search
CPC ...................................................... G06N 20/00
See application file for complete search history.

(56) References Cited

U.S. PATENT DOCUMENTS

2017/0132528 A1* 5/2017 Aslan .................... G06N 20/00

OTHER PUBLICATIONS

Alonso et al., "When is multitask learning effective? Semantic sequence prediction under varying data conditions", arXiv: 1612.02251v2, Jan. 2017, 11 pages.
Ba et al., "Do deep nets really need to be deep?", NIPS, Dec. 2014, 2:2654-2662.
Bingel et al., "Identifying beneficial task relations for multi-task learning in deep neural networks", arXiv: 1702.08303v1, Feb. 2017, 6 pages.
Bowman et al., "Looking for ELMo's Friends: Sentence-level pretraining beyond language modeling", arXiv: 1812.10860, 2019, 16 pages.
Bucilu et al., "Model compression", SIGKDD, Aug. 2006, 7 pages.
Caruana, "Multitask Learning", Machine Learning, Jul. 1997, 28:41-75.
Cer et al., "SemEval-2017 Task 1: Semantic textual similarity multilingual and crosslingual focused evaluation", SemEval, Jul. 2017, 14 pages.
Collobert et al., "A unified architecture for natural language processing: Deep neural networks with multitask learning", Proceedings of the 25th International Conference on Machine Learning, Jul. 2008, pp. 160-167.
Dai et al., "Semi-supervised sequence learning", Advances in neural information processing systsems, Nov. 2015, pp. 3079-3087.

(Continued)

*Primary Examiner* — Hsiungfei Peng
(74) *Attorney, Agent, or Firm* — Fish & Richardson P.C.

(57) ABSTRACT

Methods, systems, and apparatus, including computer programs encoded on computer storage media, for training a machine learning model using teacher annealing.

20 Claims, 3 Drawing Sheets

(56) References Cited

OTHER PUBLICATIONS

Devlin et al., "BERT: Pre-training of deep bidirectional transformers for language understanding", arXiv:1810.04805v2, May 2019, 16 pages.
Dolan et al., "Automatically constructing a corpus of sentential paraphrases", Proceedings of the Third International Workshop on Paraphrasing, 2005, pp. 9-16.
Furlanello et al., "Born again neural networks", arXiv:1805.04770, Jun. 2018, 10 pages.
Giampiccolo et al., "The third pascal recognizing textual entailment challenge", Proceedings of the Workshop on Textual Entailment and Paraphrasing, Jun. 2007, 9 pages.
Hancock et al., "Massive Multi-Task Learning with Snorkel MeTaL: Bringing More Supervision to Bear", Stanford Dawn, Mar. 2019, 8 pages.
Hashimoto et al., "A joint many-task model: Growing a neural network for multiple NLP tasks", arXiv: 1611.010587v5, Jul. 2017, 15 pages.
Hinton et al., "Distilling the knowledge in a neural network", arXiv: 1503.02531v1, Mar. 2015, 9 pages.
Holm, "A simple sequentially rejective multiple test procedure", Scandinavian journal of statistics, 1979, 6(2):65-70.
Howard et al., "Universal language model fine-tuning for text classification", arXiv: 1801.06146v5, May 2018, 12 pages.
Iyer et al., "First quora dataset release: Question pairs", Machine Learning Platform Engineer at Quora, Jan. 2017, 3 pages.
Keskar et al., "Unifying question answering and text classification via span extraction", arXiv:1904.09286, Sep. 2019, 10 pages.
Kim et al., "Sequence-level knowledge distillation", Empirical Methods in Natural Language Processing, Nov. 2016, 11 pages.
Kuncoro et al., "Distilling an ensemble of greedy dependency parsers into one mst parser", Empirical Methods in Natural Language Processing, Nov. 2016, pp. 1744-1753.
Liu et al., "Adversarial multi-task learning for text classification", ACL, Apr. 2017, 10 pages.
Liu et al., "Improving multi-task deep neural networks via knowledge distillation for natural language understanding", arXiv:1904.09482, Apr. 2019, 8 pages.
Liu et al., "Multi-task deep neural networks for natural language understanding", arXiv:1901.11504v2, May 2019, 10 pages.
Luong et al., "Multi task sequence to sequence learning", arXiv: 1511.06114v4, Mar. 2016, 10 pages.
McCann et al., "The natural language decathlon: Multitask learning as question answering", arXiv:1806.08730v1, Jun. 2018, 23 pages.
Mou et al., "Distilling word embeddings: An encoding approach", CIKM, Oct. 2016, pp. 1977-1980.
Parisotto et al., "Actor-mimic Deep multitask and transfer reinforcement learning", arXiv:1511.06342v4, Feb. 2016, 16 pages.
Peters et al., "Deep contextualized word representations", arXiv: 1802.05365v2, Mar. 2018, 15 pages.
Phang et al., "Sentence Encoders on STILTS: Supplementary Training on Intermediate Labeled-data Tasks", arXiv: 1811.01088v2, Feb. 2019, 12 pages.
Rajpurkar et al., "Squad: 100, 000+ questions for machine comprehension of text", EMNLP, Oct. 2016, 10 pages.
Ruder et al., "Latent multi-task architecture learning", AAAI, Jul. 2019, 33:4822-4829.
Ruder et al., "Sluice networks: Learning what to share between loosely related tasks", arXiv:1705.08142, May 2017, 10 pages.
Ruder, "An overview of multi-task learning in deep neural networks", arXiv:1706.05098, Jun. 2017, 14 pages.
Sanh et al., "A hierarchical multi task approach for learning embeddings from semantic tasks", Proceedings of the AAAI Conference on Artificial Intelligence, Jul. 2019, 33:6949-6956.
Sennrich et al., "Neural machine translation of rare words with subword units", arXiv: 1508.07909v5, Jun. 2016, 11 pages.
Socher et al., "Recursive deep models for semantic compositionality over a sentiment treebank", Empirical Methods in Natural Language Processing, Oct. 2013, pp. 1631-1642.
Sogaard et al., "Deep multitask learning with low level tasks supervised at lower layers", Proceedings of the 54th Annual Meeting of the Association for Comutational Linguistics, Aug. 2016, 2:231-235.
Tan et al., "Multilingual Neural Machine Translation with Knowledge Distillation", arXiv:1902.10461v3, Apr. 2019, 14 pages.
Teh et al., "Distral: Robust multitask reinforcement learning", NIPS, Jul. 2017, 11 pages.
Vaswani et al., "Attention is all you need", Advances in neural information processing systems, 2017, pp. 5998-6008.
Wang et al., "GLUE: A multi task benchmark and analysis platform for natural language understanding", arXiv: 1804.07461v3, Feb. 2019, 20 pages.
Warstadt et al., "Neural network acceptability judgments", arXiv:1805. 12471, May 2018, 17 pages.
Williams et al., "A broad-coverage challenge corpus for sentence understanding through inference", NAACL-HLT, Jun. 2018, pp. 112-1122.

* cited by examiner

TRAINING MACHINE LEARNING MODELS USING TEACHER ANNEALING

CROSS-REFERENCE TO RELATED APPLICATION

This application claims priority to U.S. Provisional Application No. 62/847,220, filed on May 13, 2019. The disclosure of the prior application is considered part of and is incorporated by reference in the disclosure of this application.

BACKGROUND

This specification relates to training machine learning models.

Machine learning models receive an input and generate an output, e.g., a predicted output, based on the received input and on values of the parameters of the model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system implemented as one or more computers programs on one or more computers in one or more locations that trains a machine learning model using teacher annealing.

The machine learning model that is being trained will be referred to in this specification as a "student machine learning model" and the parameters of the student machine learning model, i.e., the parameters that are being updated by the training, will be referred to as the "student parameters."

In particular, during the training, the system uses both ground truth outputs and teacher outputs generated by one or more already trained teacher machine learning models. By performing teacher annealing, the system repeatedly adjusts, during the training, a weight value that defines a weighting between teacher outputs and ground truth outputs that is used in computing the objective function for the training.

Particular embodiments of the subject matter described in this specification can be implemented so as to realize one or more of the following advantages.

This specification describes using teacher annealing to improve the training of a student machine learning model when outputs generated by an already trained teacher model are available. By using teacher annealing, early in training, the student model is mostly distilling, i.e., mostly learning from the outputs of the teacher model, to get as useful of a training signal as possible. Towards the end of training, the student model is mostly relying on the ground truth output. This progression allows the student machine learning model to achieve performance on any given task that exceeds the teacher machine learning model for that task, even when the student machine learning model is a multi-task machine learning model and the teacher model is a single-task machine learning model that is specific to that task. In particular, using these techniques, the student model can exceed the performance of the teacher without being trained on any more training data than was used to train the teacher. Moreover, in the multi-task setting, the described techniques allow the student machine learning model to achieve robust multi-task gains, i.e., relative to conventional training techniques for those tasks, across many tasks at once.

Additionally, by making use of the teacher model(s) during training as described in this specification, the student model can be trained to perform equally as well or even better than the teacher model(s) even when the student model consumes fewer computational resource to generate an output than the teacher model(s). For example, in the case where both the teacher model and the student model are single task models, the student model can have fewer parameters than the teacher model or generate the student output in fewer iterations than are required by the teacher model. As a particular example, the student and teacher model can have similar architectures, but with the student model having fewer neural network layers and therefore fewer parameters. As another particular example, the teacher model can be an auto-regressive model that generates outputs over many iterations while the student model is a feedforward model that generates the student output in a single forward pass through the student model. As another example, when the teacher models are single-task models while the student model is a multi-task model, the student model can have many fewer parameters than the combined total number of parameters in the teacher models, e.g., by virtue of having certain parameters that are shared between all of the multiple tasks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
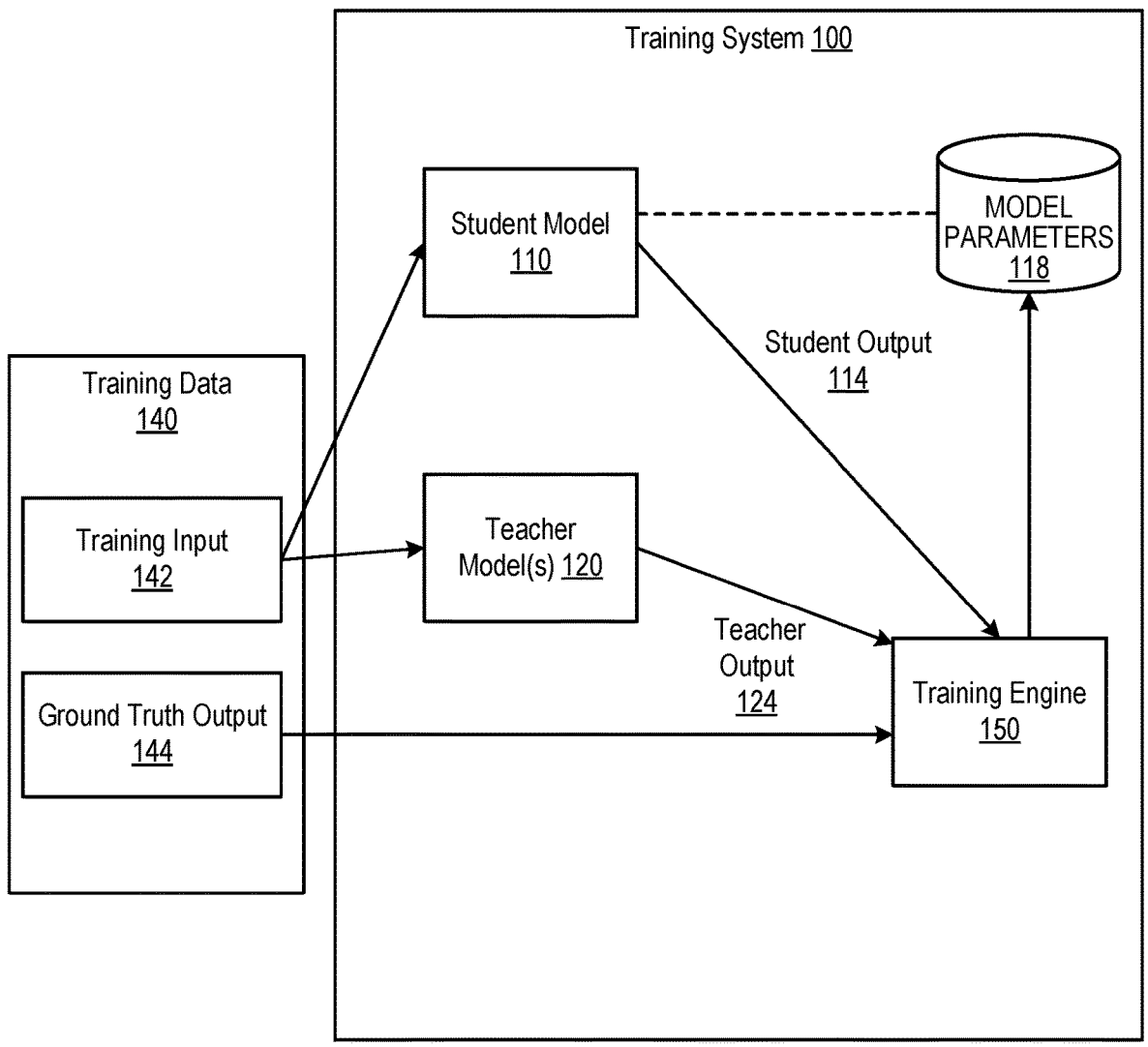
FIG. 1 shows an example machine learning model training system.

FIG. 1 shows an example machine learning model training system 100. The machine learning model training system 100 is an example of a system implemented as computer programs on one or more computers in one or more locations, in which the systems, components, and techniques described below can be implemented.

This training system 100 trains a machine learning model 110. The machine learning model 110 that is being trained will be referred to in this specification as a "student machine learning model" and the parameters 118 of the student machine learning model, i.e., the parameters that are being updated by the training, will be referred to as the "student parameters."

In some implementations, the student machine learning model 110 is a single-task machine learning model that is only configured to perform a single machine learning task, and the system 100 trains the student machine learning model 110 to perform the single machine learning task.

For example, the single task can be a natural language processing task, e.g., an entailment task, a paraphrase task, a textual similarity task, a sentiment task, a grammaticality task, and so on.

As another example, the single task can be an image processing task, e.g., image classification, object detection, semantic segmentation, image augmentation, domain transfer, and so on.

As another example, the single task can be a health prediction task, where the inputs to the machine learning model are electronic health record data for a patient, and the model output for a given patient can be a probability distribution over patient health-related categories, e.g., possible diagnoses for the patient, possible future health events associated with the patient, and so on.

As another example, the single task can be an audio processing task, e.g., speech recognition, language identification, hotword detection, and so on.

Thus, in these cases, the student machine learning model 110 receives an input that is specific to the task and generates a student output for the task.

In some other implementations, the student machine learning model 110 is a multi-task machine learning model that is configured to perform multiple machine learning tasks and the system 100 trains the student machine learning model 110 to perform all of the multiple machine learning tasks.

In other words, in these implementations the student machine learning model 110 receives an input of a type that is common to all of the machine learning tasks and generates a model output that includes multiple student outputs, one for each of the machine learning tasks.

For example, the multiple tasks can be multiple different natural language processing tasks that can be performed on the same input text sequence.

As another example, the multiple tasks can be multiple different image processing tasks that can be performed on the same input image.

The machine learning model 110 can have any architecture that is appropriate for the type of model inputs processed by the machine learning model 110. For example, when the model inputs are images or audio data, the machine learning model 110 can be a convolutional neural network. When the model inputs are text sequences or sequences of other features, e.g., electronic health record features or audio features, the machine learning model 110 can be a self-attention based neural network, e.g., a Transformer, or a recurrent neural network, e.g., a long short-term memory (LSTM) neural network. When the model inputs include inputs of multiple modalities, e.g., both images and text, the model 110 can include different types of neural networks, e.g., both convolutional layers and self-attention or recurrent layers.

When the model 110 is a multi-task model, the model 110 can include initial layers that are shared among all of the tasks and a respective set of task-specific output layers for each of the multiple tasks. As another example, all of the layers of the model 110 can be shared between tasks and the model inputs that are processed by the model 110 can each include an identifier or other data identifying the task that is to be performed by the model 110 for the model input.

The system 100 receives training data 140 for use in training the student machine learning model 110. More specifically, for a given task that the system 100 is training the student machine learning model 110 on, the training data 140 includes training inputs 142 and, for each training input 144, a ground truth output 144 for the given task. The ground truth output 144 is the output that should be generated by the student machine learning model 110 for the given task by processing the training input 142. In other words, the ground truth output 144 is a known, (presumed) accurate output for the given task.

The system 100 then uses the ground truth outputs 144 and one or more teacher machine learning models 120 to train the student machine learning model 110.

Generally, each of the teacher machine learning models 120 is a machine learning model that has already been trained to perform one or more of the tasks that the student machine learning model 110 is being trained to perform.

In particular, when the student machine learning model 100 is a single task model that is being trained for a single task, the system 100 uses a single teacher model 120 (or, equivalently, an ensemble of single task teacher models whose outputs are combined to generate the teacher output) that has been trained to perform the single task.

In some of these cases, the student machine learning model 110 can be a smaller model, i.e., can have fewer parameters and a lower computational footprint, than the teacher model 120, and the system 100 can use the training process to generate a trained model that is more computationally efficient than the single teacher model 120 while having comparable or better accuracy than the teacher model 120.

For example, the teacher model 120 can have a similar architecture to that of the student model 110, but the student model 110 can have fewer neural network layers, and therefore fewer parameters.

In others of these cases, the teacher machine learning model 120 can be an auto-regressive model that generates outputs over many time steps, while the student machine learning model 110 is a feedforward model that requires only a single time step to generate an output. For example, the teacher model 120 can be an auto-regressive convolutional, self-attention, or recurrent neural network, while the student model 110 is a feedforward convolutional neural network.

In yet others of these cases, the teacher model 120 and the student model 110 can have the same architecture, and the system can use the training process to generate a trained model that is better performing than the teacher model 120.

In some cases, when the student model 110 is a multi-task model, the system 100 uses a single teacher model 120 that is also a multi-task model and the system 100 uses the same teacher model 120 for all of the tasks. That is, in these cases, the system may be training a more computationally efficient model than the teacher model 120 or training a model that has the same architecture but improves the performance of the teacher model 120, as described above.

In other cases, when the student model 110 is a multi-task model, the system 100 uses multiple different teacher models 120 for the different tasks on which the multi-task student model 110 is being trained. For example, the system 100 can use a respective single-task teacher model 120 for each of the multiple tasks the student model 110 is being trained to perform. Thus, in these cases, the system 100 is using the training process to train a single model 110 that has many fewer parameters and a smaller computational footprint than the combined parameters and computational footprint of all of the teacher models 120.

In general, during the training, a training engine 150 in the system 100 repeatedly uses ground truth outputs 144 and teacher outputs 124 generated by the one or more teacher models 120 to determine errors in student outputs 114 generated by the student machine learning model 110. The training engine 150 then uses the errors to update the values of the model parameters 118.

More specifically, the training engine 150 uses a technique that will be referred to as teacher annealing to repeatedly adjust a weight value that defines a weighting between teacher outputs 124, i.e., outputs generated by one of the teacher models 120, and ground truth outputs 144 that is used in computing the objective function for the training. Training the model 110 using teacher annealing is described in more detail below with reference to FIGS. 2 and 3.

In some implementations, prior to training the student model 110 using teacher annealing, the training engine 150 pre-trains the student machine learning model 110 on an unsupervised task. Pre-training the student model 110 can, in some cases, improve the performance of the final trained model without requiring additional labeled data. For example, when the tasks are natural language processing tasks, the unsupervised task can be an unsupervised language modeling task, e.g., as described in Devlin, Jacob; Chang, Ming-Wei; Lee, Kenton; Toutanova, Kristina (11 Oct. 2018). "BERT: Pre-training of Deep Bidirectional Transformers for Language Understanding". arXiv: 1810.04805v2.

Once the model 110 has been trained, the system 100 can provide data specifying the trained model for use in processing new network inputs. That is, the system 100 can output, e.g., by outputting to a user device or by storing in a memory accessible to the system 100, the trained values of the model parameters for later use in processing inputs using the trained model.

Alternatively or in addition to outputting the trained model data, the system 100 can instantiate an instance of the machine learning model having the trained values of the model parameters, receive inputs to be processed, e.g., through an application programming interface (API) offered by the system, use the trained model to process the received inputs to generate model outputs and then provide the generated model outputs, classification outputs, or both in response to the received inputs.

Figure 2:
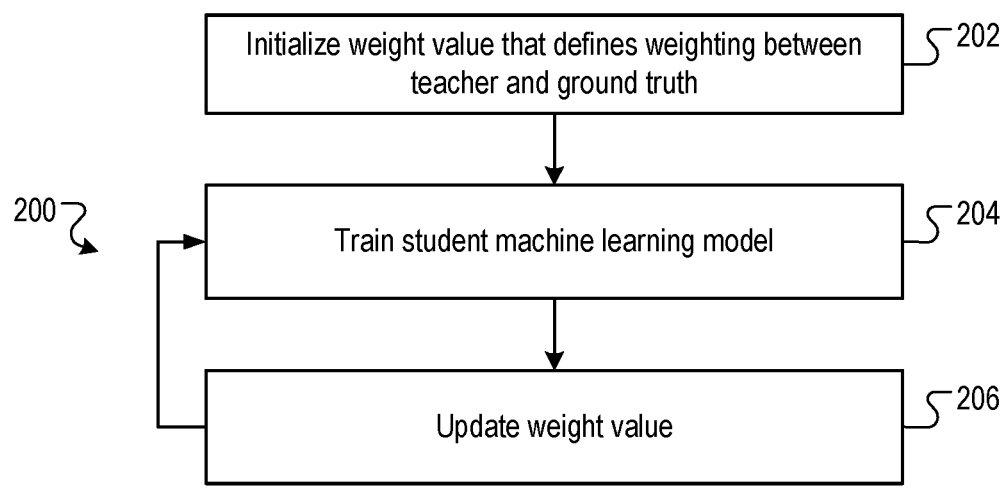
FIG. 2 is a flow diagram of an example process for training the student machine learning model.

FIG. 2 is a flow diagram of an example process 200 for training the student machine learning model. For convenience, the process 200 will be described as being performed by a system of one or more computers located in one or more locations. For example, a machine learning model training system, e.g., the machine learning model training system 100 of FIG. 1, appropriately programmed, can perform the process 200.

The system initializes a weight value that defines a weighting between teacher outputs and ground truth outputs (step 202). In other words, the system sets the weight value to a fixed initial value prior to beginning the training.

The weight value determines the weight assigned to the teacher output for a given training input and the ground truth output for the given training input when computing a weighted combination of the teacher output.

In some cases, the weight value $\lambda$ can be the weight that is assigned to the ground truth output in the weighted combination and the weight that is assigned to the teacher output is then equal to $1-\lambda$. In these cases, the system initializes the weight value to a value that is equal to 0 or that is within a threshold value of 0, i.e., such that teacher outputs are initially strongly favored in the weighted combination relative to the ground truth outputs.

In other cases, the weight value $\lambda$ can be the weight that is assigned to the teacher output in the weighted combination and the weight that is assigned to the ground truth output is then equal to $1-\lambda$. In these cases, the system initializes the weight value to a value that is equal to 1 or that is within a threshold value of 1, i.e., such that teacher outputs are initially strongly favored in the weighted combination relative to the ground truth outputs.

The system trains the student machine learning model on training data until criteria are satisfied for updating the weight value (step 204).

In particular, the system repeatedly performs training iterations on mini-batches of training iterations to optimize an objective function that measures, for any given training input, an error between (i) the weighted combination of the teacher output and the ground truth output for the given training input and (ii) the student output generated by the student machine learning model for the training input.

For example, when $\lambda$ is the weight assigned to the ground truth output, the objective function 1 for a task T can be expressed as:

$$l(\lambda y_T^i + (1-\lambda) f_T(x_T^i, \theta_T), f_T(x_T^i, \theta))$$

where $\lambda y_T^i$ is the ground truth output for a training input $x_T^i$ for the task T, $f_T(x_T^i, \theta_T)$ is the teacher output generated for the training input $x_T^i$ by the already trained teacher model for the task T in accordance with the trained values of the parameters $\theta_T$ of the teacher model, and $f_T(x_T^i, \theta)$ is the student output generated for the training input $x_T^i$ by the student model in accordance with the current values of the student parameters $\theta$.

The objective function measures the error in a way that is appropriate for the given task T.

For example, when the task T is a classification task and the student output, the teacher output and the ground truth output are probability distributions, the objective function can be a cross entropy loss that measures a cross entropy between the weighted combination and the student output.

As another example, when the task T is a regression task and the student output, the teacher output and the ground truth output are each ordered collections of one or more regressed values, the objective function can be a distance loss, e.g., an L2 distance loss, that measures a distance between the weighted combination and the student output.

At each training iteration, the system computes an update to the current values of the student model parameters as of the iteration using the mini-batch of training data and then applies the update to the current values of the student parameters. Updating the current values is described below with reference to FIG. 3.

The system can determine that the criteria are satisfied for updating the weight value at any appropriate point during the training. For example, the system can determine that the criteria are satisfied every N training iterations, i.e., after every N updates that are applied to the student model. As another example, the system can determine that the criteria are satisfied every time a certain amount of time elapses during the training. As yet another example, the system can maintain a set of performance benchmarks and can determine that the criteria are satisfied each time the performance of the student model, e.g., as measured on a validation data set, hits one of the performance benchmarks.

Once the criteria are satisfied during the training, the system updates the weight value to increasingly favor the ground truth outputs in the weighting (step 206).

For example, when the ground truth outputs are assigned a weight that is equal to the weight value, the system can linearly increase the weight at certain points during the training, i.e., each time the criteria are satisfied, so that the weight value moves closer to one from a starting point of zero or close to zero.

That is, the system updates the weight value according to a linear schedule to increasingly favor the ground truth outputs e.g., linearly increase the weight after every N updates have been applied to the student parameters (when the ground truth outputs are assigned a weight that is equal to the weight value) or linearly decrease the weight after every N updates have been applied (when the teacher outputs are assigned a weight that is equal to the weight value).

As another example, the system can update the weight value according to an exponential schedule to increasingly favor the ground truth outputs, e.g., exponentially increase the weight after every N updates have been applied to the student parameters (when the ground truth outputs are assigned a weight that is equal to the weight value) or exponentially decrease the weight after every N updates have been applied (when the teacher outputs are assigned a weight that is equal to the weight value).

The process 200 then returns to step 204, i.e., the system continues to train the model until the criteria for updating the weight value are again satisfied. The system can continue repeating steps 204 and 206 until termination criteria for the training are satisfied, e.g., a specified number of iterations of step 204 have been performed, a specified amount of time has elapsed, or the student model parameters have converged.

Thus, by repeatedly performing steps 204 and 206 during the training, the system repeatedly updates the weight value to increasingly favor the ground truth outputs in the weighting. That is, as training progresses, the system continues to adjust the weight value so that the ground truth outputs are given more and more weight in the weighted combinations relative to the teacher outputs.

Figure 3:
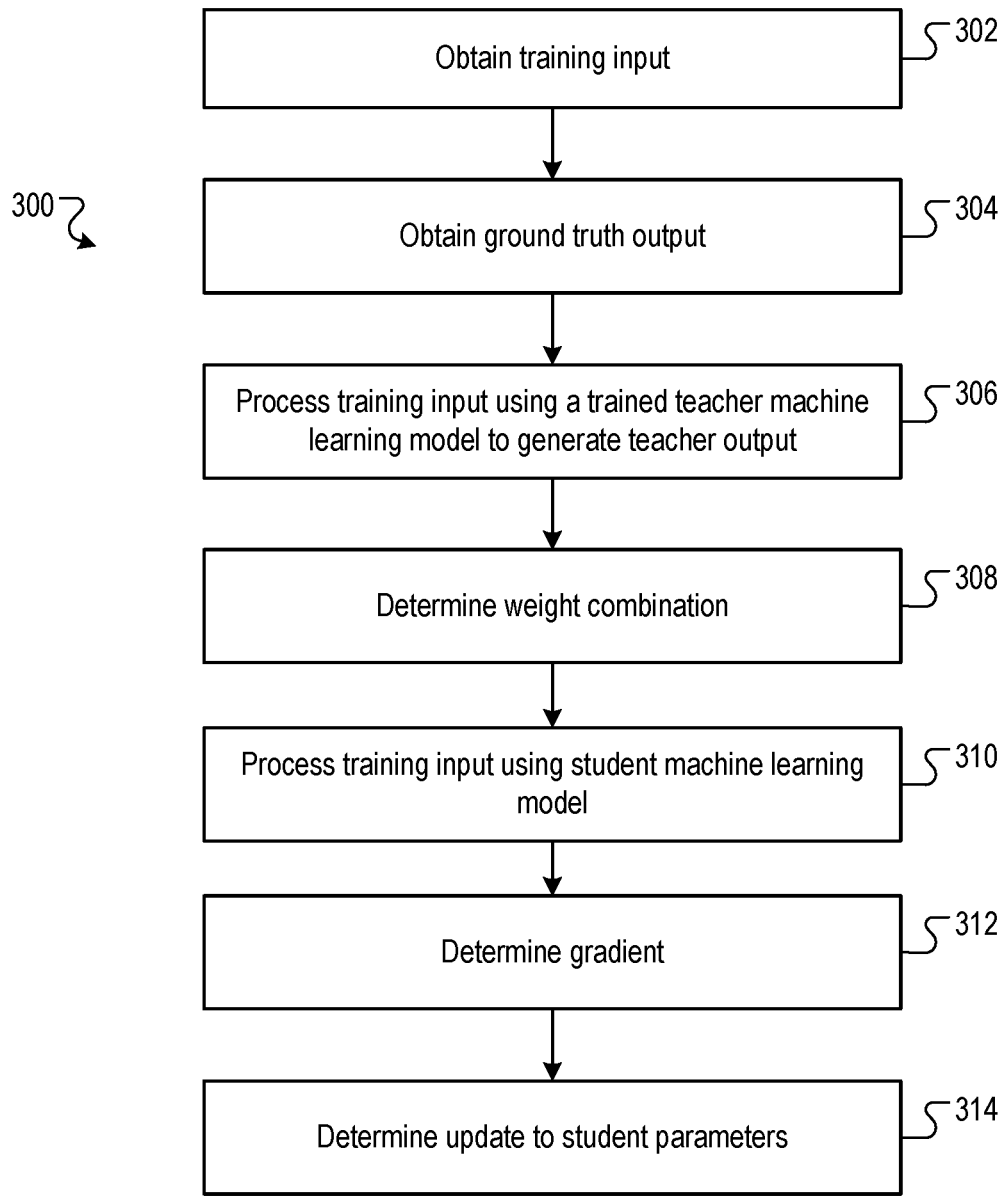
FIG. 3 is a flow diagram of another example process for determining an update to the student parameters using the current weight value.

FIG. 3 is a flow diagram of an example process 300 for determining an update to the current values of the parameters of the student machine learning model. For convenience, the process 300 will be described as being performed by a system of one or more computers located in one or more locations. For example, a machine learning model training system, e.g., the machine learning model training system 100 of FIG. 1, appropriately programmed, can perform the process 300. By adjusting the weight value as described in this specification.

The system can perform the process 300 for each training input in a mini-batch of training inputs to determine a respective update for each training input. The system can then combine the updates, e.g., by summing or averaging the updates, and apply the combined update to the current values of the student parameters, e.g., by adding the combined update to or subtracting the combined update from the current values.

When the student model is a single-task model, the training inputs in the mini-batch will all be training inputs for the single task.

When the student model is a multi-task model, the mini-batch can include training inputs for different ones of the multiple tasks. For example, the system can sample each training input in the mini-batch from an overall training data set including training data for all of the tasks or can sample a specified number of training inputs from each of the multiple tasks to generate the mini-batch.

The system obtains a training input for a first machine learning task and a ground truth output for the training input (step 302).

The system processes the training input using a trained first teacher machine learning model to generate a teacher output for the first machine learning task (step 304). As described above, the trained first teacher machine learning model has already been trained to perform the first machine learning task. In some cases, the system pre-processes all of the training data for the first task using the trained first teacher machine learning model prior to the beginning of training to generate the teacher outputs for the training inputs in the training data. In other cases, the system processes the training inputs using the trained first machine learning model on-line, i.e., when the teacher output is required for use in training, during the training.

The system determines a weighted combination of the teacher output for the first machine learning task and the ground truth output for the first training input in accordance with the weight value (step 306). In other words, the system computes the weighted combination of the teacher output and the ground truth output by weighting the ground truth and teacher outputs in accordance with the current weight as of the current iteration of the process 300.

The system processes the training input using the student machine learning model and in accordance with the student parameters to generate a student output for the first machine learning task (step 308).

The system then determines, through backpropagation, a gradient with respect to the student parameters of the objective function that measures an error between the weighted combination and the student output (step 310) and determines an update to the student parameters from the gradient (step 312). For example, the system can determine the update in accordance with the update rule of the optimizer being used to train the machine learning model, e.g., stochastic gradient descent, rmsProp, Adam, and so on, i.e., by applying the update rule for the optimizer to the gradient.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a student machine learning model having a plurality of student parameters to perform at least a first machine learning task, wherein the student machine learning model is configured to receive a model input and to process the model input in accordance with the student parameters to generate an output comprising a student output for the first machine learning task, the method comprising:
    initializing a weight value that defines a weighting between teacher outputs and ground truth outputs;
    training the student machine learning model on training data comprising a plurality of first training inputs and, for each first training input, a respective ground truth output for the first training input for the first machine learning task, the training comprising, for each first training input:
        processing the training input using a trained first teacher machine learning model to generate a teacher output for the first machine learning task, wherein the trained first teacher machine learning model has already been trained to perform the first machine learning task;
        determining a weighted combination of the teacher output for the first machine learning task and the ground truth output for the first training input in accordance with the weight value;
        processing the training input using the student machine learning model and in accordance with the student parameters to generate a student output for the first machine learning task;
        determining a gradient with respect to the student parameters of an objective function that measures an error between the weighted combination and the student output; and
        determining an update to the student parameters from the gradient; and
    during the training, repeatedly updating the weight value to increasingly favor the ground truth outputs in the weighting.

2. The method of claim 1, wherein repeatedly updating the weight value comprises:
    repeatedly linearly increasing the weight value during the training.

3. The method of claim 1, wherein the student output, the teacher output and the ground truth output are probability distributions, and wherein the objective function is a cross entropy loss that measures a cross entropy between the weighted combination and the student output.

4. The method of claim 1, wherein the first machine learning task is a regression task, wherein the student output, the teacher output and the ground truth output are each ordered collections of one or more regressed values, and wherein the objective function is a distance loss that measures a distance between the weighted combination and the student output.

5. The method of claim 1, wherein the student machine learning model is a single-task model being trained only to perform the first machine learning task, and wherein the model output comprises only the student output for the first task.

6. The method of claim 1, wherein
    the student machine learning model is a multi-task model being trained to perform a plurality of machine learning tasks including the first machine learning task,
    wherein the model output comprises a respective student output for each of the plurality of machine learning tasks,
    wherein the training data comprises, for each of the plurality of machine learning tasks, a respective plurality of training inputs and, for each of the plurality of training inputs for the machine learning task, a respective ground truth output for the first machine learning task, and
    wherein the training comprises training the student machine learning model on the training data to perform all of the plurality of machine learning tasks.

7. The method of claim 6, wherein the trained first teacher machine learning model is a multi-task model that has already been trained on the plurality of tasks, and wherein the training further comprises, for each of the plurality of tasks and for each of the training inputs for the task:
processing the training input using the trained first teacher machine learning model to generate a teacher output for the machine learning task;
determining a weighted combination of the teacher output for the machine learning task and the ground truth output for the training input in accordance with the weight value;
processing the training input using the student machine learning model and in accordance with the student parameters to generate a student output for the machine learning task;
determining a gradient with respect to the student parameters of an objective function that measures an error between the weighted combination and the student output; and
determining an update to the student parameters from the gradient.

8. The method of claim 6, wherein the trained first teacher machine learning model is a single-task model, and
wherein the training further comprises, for each of the plurality of tasks and for each of the training inputs for the task:
processing the training input using a different trained teacher machine learning model that is specific to the machine learning task to generate a teacher output for the machine learning task;
determining a weighted combination of the teacher output for the machine learning task and the ground truth output for the training input in accordance with the weight value;
processing the training input using the student machine learning model and in accordance with the student parameters to generate a student output for the machine learning task;
determining a gradient with respect to the student parameters of an objective function that measures an error between the weighted combination and the student output; and
determining an update to the student parameters from the gradient.

9. The method of claim 6, wherein the student machine learning model is a neural network that includes an encoder neural network that is shared between all of the plurality of tasks and respective output neural networks for each of the plurality of machine learning tasks.

10. The method of claim 6, wherein the model input to the student machine learning model is a sequence of text in a natural language and wherein the plurality of machine learning tasks are different natural language processing tasks that can be performed on the sequence of text.

11. The method of claim 1, further comprising:
prior to the training, pre-training the student machine learning model on an unsupervised task.

12. The method of claim 11, wherein the first machine learning task is a natural language processing task and the unsupervised task is an unsupervised language modeling task.

13. The method of claim 1, further comprising:
after training the student machine learning model to perform at least the first machine learning task:
receiving a new network input for the first machine learning task; and
processing the new network input using the trained student machine learning model to generate a new network output for the new network input for the first machine learning task.

14. A system comprising one or more computers and one or more storage devices storing instructions that when executed by the one or more computers cause the one more computers to perform operations for training a student machine learning model having a plurality of student parameters to perform at least a first machine learning task, wherein the student machine learning model is configured to receive a model input and to process the model input in accordance with the student parameters to generate an output comprising a student output for the first machine learning task, the operations comprising:
initializing a weight value that defines a weighting between teacher outputs and ground truth outputs;
training the student machine learning model on training data comprising a plurality of first training inputs and, for each first training input, a respective ground truth output for the first training input for the first machine learning task, the training comprising, for each first training input:
processing the training input using a trained first teacher machine learning model to generate a teacher output for the first machine learning task, wherein the trained first teacher machine learning model has already been trained to perform the first machine learning task;
determining a weighted combination of the teacher output for the first machine learning task and the ground truth output for the first training input in accordance with the weight value;
processing the training input using the student machine learning model and in accordance with the student parameters to generate a student output for the first machine learning task;
determining a gradient with respect to the student parameters of an objective function that measures an error between the weighted combination and the student output; and
determining an update to the student parameters from the gradient; and
during the training, repeatedly updating the weight value to increasingly favor the ground truth outputs in the weighting.

15. The system of claim 14, wherein repeatedly updating the weight value comprises:
repeatedly linearly increasing the weight value during the training.

16. The system of claim 14, wherein the student output, the teacher output and the ground truth output are probability distributions, and wherein the objective function is a cross entropy loss that measures a cross entropy between the weighted combination and the student output.

17. The system of claim 14, wherein the first machine learning task is a regression task, wherein the student output, the teacher output and the ground truth output are each ordered collections of one or more regressed values, and wherein the objective function is a distance loss that measures a distance between the weighted combination and the student output.

18. The system of claim 14, wherein the student machine learning model is a single-task model being trained only to perform the first machine learning task, and wherein the model output comprises only the student output for the first task.

19. The system of claim 14, wherein
the student machine learning model is a multi-task model being trained to perform a plurality of machine learning tasks including the first machine learning task,
wherein the model output comprises a respective student output for each of the plurality of machine learning tasks,
wherein the training data comprises, for each of the plurality of machine learning tasks, a respective plurality of training inputs and, for each of the plurality of training inputs for the machine learning task, a respective ground truth output for the first machine learning task, and
wherein the training comprises training the student machine learning model on the training data to perform all of the plurality of machine learning tasks.

20. One or more non-transitory computer-readable storage media storing instructions that when executed by one or more computers cause the one more computers to perform operations for training a student machine learning model having a plurality of student parameters to perform at least a first machine learning task, wherein the student machine learning model is configured to receive a model input and to process the model input in accordance with the student parameters to generate an output comprising a student output for the first machine learning task, the operations comprising:
   initializing a weight value that defines a weighting between teacher outputs and ground truth outputs;
   training the student machine learning model on training data comprising a plurality of first training inputs and, for each first training input, a respective ground truth output for the first training input for the first machine learning task, the training comprising, for each first training input:
      processing the training input using a trained first teacher machine learning model to generate a teacher output for the first machine learning task, wherein the trained first teacher machine learning model has already been trained to perform the first machine learning task;
      determining a weighted combination of the teacher output for the first machine learning task and the ground truth output for the first training input in accordance with the weight value;
      processing the training input using the student machine learning model and in accordance with the student parameters to generate a student output for the first machine learning task;
      determining a gradient with respect to the student parameters of an objective function that measures an error between the weighted combination and the student output; and
      determining an update to the student parameters from the gradient; and
   during the training, repeatedly updating the weight value to increasingly favor the ground truth outputs in the weighting.

* * * * *